United States Patent
Olar

(10) Patent No.: US 9,028,244 B1
(45) Date of Patent: May 12, 2015

(54) LIFTER FOR AN INJECTION MOLDING TOOL

(71) Applicant: David V Olar, Troy, MI (US)

(72) Inventor: David V Olar, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 14/099,133

(22) Filed: Dec. 6, 2013

(51) Int. Cl.
*B29C 45/40* (2006.01)
*B29L 31/00* (2006.01)

(52) U.S. Cl.
CPC ......... *B29C 45/401* (2013.01); *B29L 2031/757* (2013.01); *B29C 45/4005* (2013.01)

(58) Field of Classification Search
CPC ........................... B29C 45/401; B29C 45/4005
USPC .................... 425/556, DIG. 58; 264/318, 334
See application file for complete search history.

(56) References Cited

U.S. PATENT DOCUMENTS

| | | | |
|---|---|---|---|
| 2,529,091 A * | 11/1950 | Lester | 249/57 |
| 5,814,357 A * | 9/1998 | Boskovic | 425/556 |
| 6,116,891 A | 9/2000 | Starkey | |
| 6,491,513 B1 | 12/2002 | Schneider | |
| 7,435,079 B2 | 10/2008 | Wang et al. | |
| 8,241,031 B2 * | 8/2012 | Starkey et al. | 425/556 |
| 2008/0179793 A1 | 7/2008 | Schad et al. | |
| 2011/0003027 A1 | 1/2011 | Navarra Pruna | |
| 2012/0107440 A1 | 5/2012 | Li et al. | |

* cited by examiner

*Primary Examiner* — Tim Heitbrink
(74) *Attorney, Agent, or Firm* — Ralph E Smith

(57) ABSTRACT

An actuator for an injection molding tool includes a housing, a plunger and a slide member. The housing includes an aperture extending therethrough and a first recess extending through an open end of the aperture. The plunger is slidably received in the aperture and is movable therein relative to the housing between first and second positions. The plunger may include a second recess formed therein that cooperates with the first recess to define a cavity when the plunger is in the first position. The slide member slidably engages the plunger for movement relative to the plunger between an extended position in which the slide member extends into the cavity and a retracted position in which the slide member is retracted out of the cavity.

20 Claims, 4 Drawing Sheets

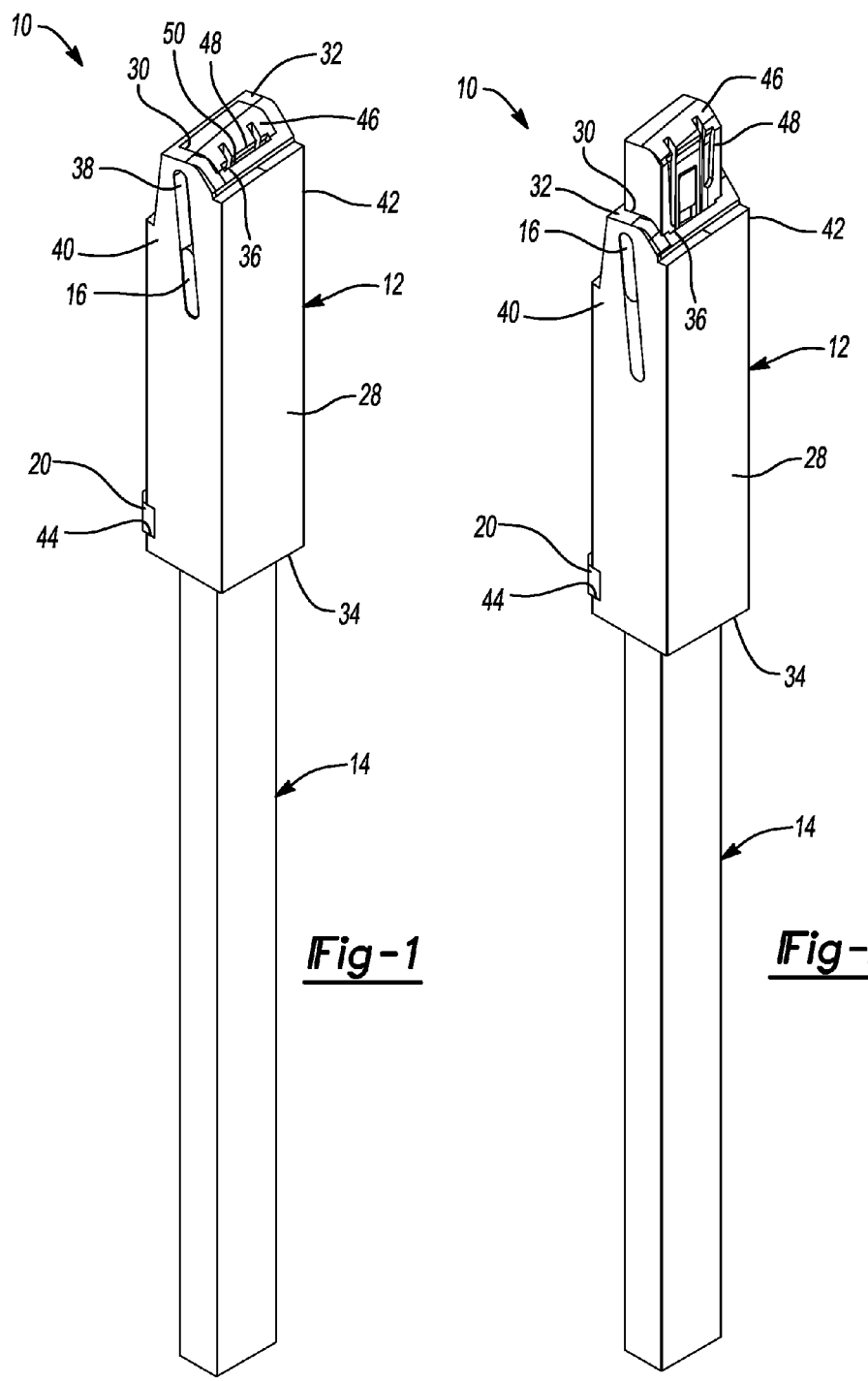

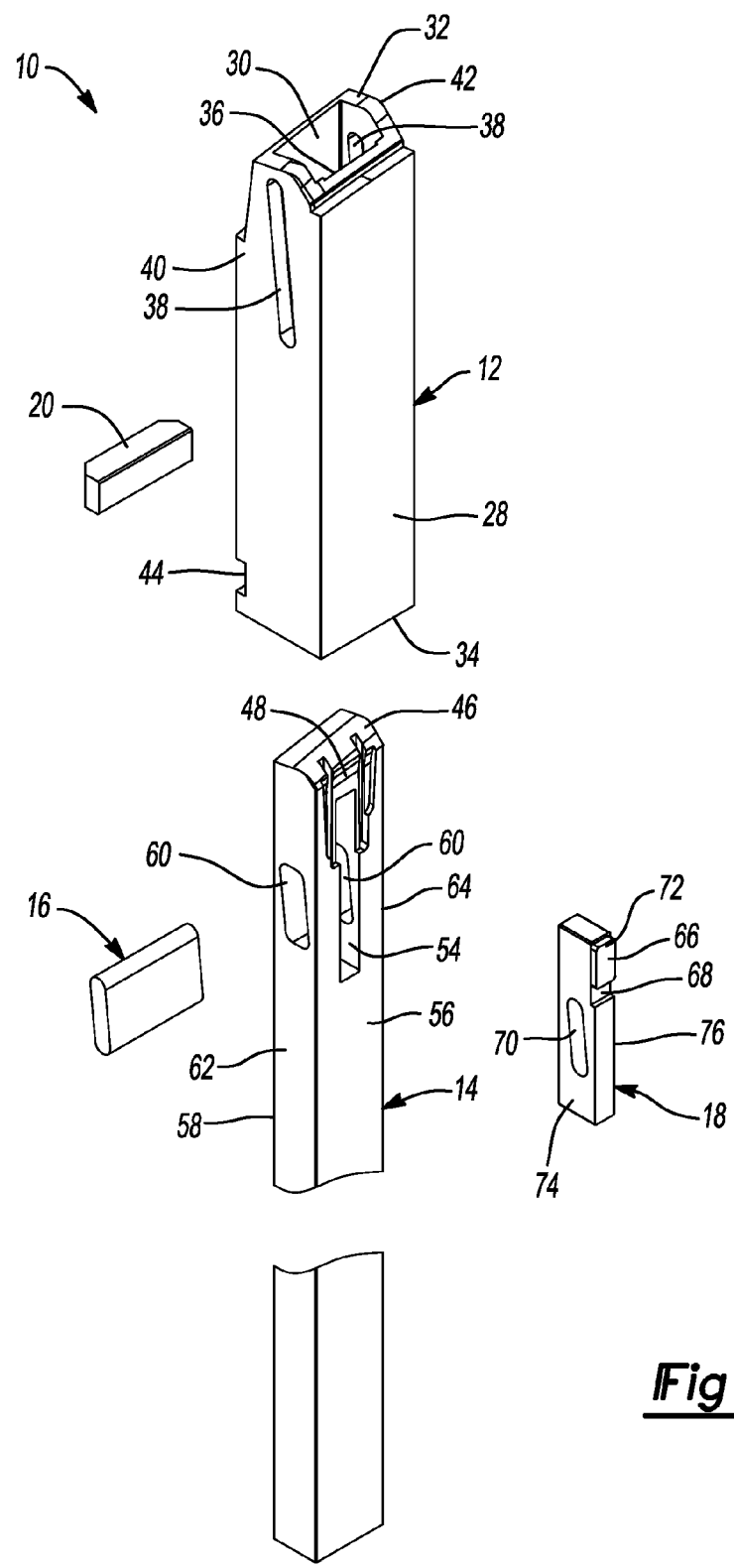

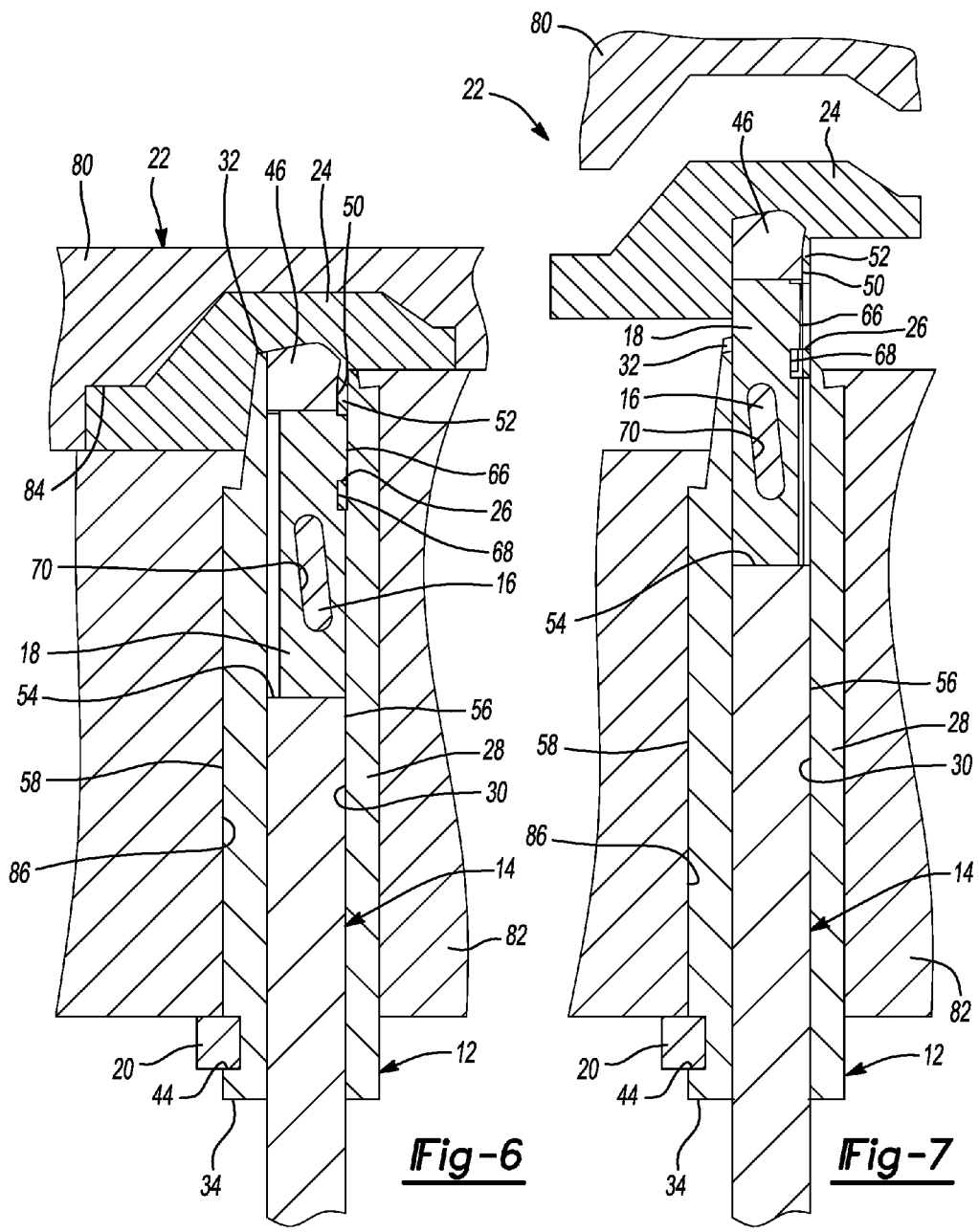

LIFTER FOR AN INJECTION MOLDING TOOL

FIELD

The present disclosure relates to a lifter for an injection molding tool.

BACKGROUND

Injection molds such as plastic-injection molds are used in a wide variety of industries to produce a myriad of components. For example, plastic-injection molds are used in the automotive industry to produce trim components and fasteners, just to name a few.

Plastic-injection molds typically include a first mold half and a second mold half that cooperate to create a cavity when in a closed state. Specifically, when the first mold half and the second mold half are in contact with one another, the mold is in the closed state and a cavity is formed therebetween. The cavity defines the shape of the resulting component formed by the mold and may include a lifer or actuator disposed therein that aids in the formation of the resulting component as well as its ejection from the mold following formation.

The actuator may include a projection that is movable between an extended state and a retracted state. When the projection is in the extended state, the projection may be used to form an aperture or recess in the resulting component by preventing resin from flowing in an area of the projection. Following formation of the aperture or recess, the projection may be moved into the retracted state to permit removal of the resulting component from the mold.

During operation, one or both of the first mold half and the second mold half are moved along an axis toward one another until the first mold half and the second mold half are in contact with one another. At this point, the mold is in the closed state and the cavity is formed. If the mold includes an actuator having a projection, the projection is moved into the extended state to allow the projection to cooperate with the cavity to define the shape of the resulting component formed by the mold.

A supply of resin is typically heated remotely from the mold to allow the resin to flow into the cavity formed between the first mold half and the second mold half. The resin may be transferred to the mold via an auger that forces the molten resin into the cavity under pressure. The molten resin flows into the cavity and around the projection, thereby filling the void and taking the shape of the cavity. Once the resin sufficiently cools, the first mold half and the second mold half are separated, the projection is moved from the extended state to the retracted state, and the resulting component is ejected from the mold.

SUMMARY

The present disclosure provides a lifter or actuator for an injection molding tool. The actuator includes a housing, a plunger and a slide member. The housing includes an aperture extending therethrough. The aperture may include a first recess extending through an open end of the aperture. The plunger is slidably received in the aperture and is movable therein relative to the housing between first and second positions. The plunger may include a second recess formed therein that may cooperate with the first recess to define a cavity when the plunger is in the first position. The slide member slidably engages the plunger for movement relative to the plunger between an extended position in which the slide member extends into the cavity and a retracted position in which the slide member is retracted out of the cavity.

In some embodiments, movement of the plunger relative to housing from the first position to the second position causes corresponding movement of the slide member from the extended position to the retracted position.

In some embodiments, the plunger moves relative to the housing between the first and second positions in a first direction. The slide member may move relative to the plunger between the extended and retracted positions in a second direction that is perpendicular to the first direction.

In some embodiments, the actuator may include a guide slidably engaging the housing and attached to the slide member for movement with the slide member between the extended and retracted positions.

In some embodiments, the housing may include a slot that is angled relative to a direction in which the plunger moves relative to the housing between the first and second positions. The guide may slidably engage the slot.

In some embodiments, the actuator may include a stop member extending outward from an exterior surface of the housing.

In some embodiments, the plunger may move in a linear path relative to the housing between the first and second positions.

In some embodiments, the slide member may move in a linear path relative to the plunger between the extended and retracted positions.

In another form, the present disclosure provides an injection molding tool that may include first and second mold blocks and an actuator. The second mold block cooperates with the first mold block to define a first cavity therebetween. The actuator may be supported by one of the first and second mold blocks. The actuator includes a housing, a plunger and a slide member. The plunger is movable within the housing and cooperates with the housing to define a second cavity therebetween that may be in communication with the first cavity. The slide member is movable relative to the plunger between an extended position in which a portion of the slide member is received in the second cavity and a retracted position in which the portion of the slide member is retracted from the second cavity.

In some embodiments, the slide member may include a boss that extends into the second cavity when the slide member is in the extended position. The boss may define an aperture in a molded component formed within the first and second cavities.

In some embodiments, the slide member moves between the extended and retracted positions in response to movement of the plunger relative to the housing.

In some embodiments, the housing includes an aperture extending therethrough and a first recess extending through an open end of the aperture. The plunger is slidably received in the aperture and may include a second recess that cooperates with the first recess to define the second cavity.

In some embodiments, the plunger may move within the aperture in the housing in a first direction and the slide member may move relative to the plunger between the extended and retracted positions in a second direction that is perpendicular to the first direction.

In some embodiments, the actuator may include a guide slidably engaging the housing and attached to the slide member for movement with the slide member between the extended and retracted positions.

In some embodiments, the housing may include a slot that is angled relative to a direction in which the plunger moves relative to the housing. The guide may slidably engage the slot.

In some embodiments, the plunger may move in a first linear path relative to the housing between first and second positions, and the slide member may move in a second linear path relative to the plunger between the extended and retracted positions. The first and second linear paths may be perpendicular to each other.

In some embodiments, the housing and the plunger may extend into the first cavity.

In some embodiments, the actuator may include a stop member that extends outward from an exterior surface of the housing and engages one of the first and second mold blocks to position the actuator relative thereto.

In some embodiments, the housing may include one or more ledges that abut one or more ledges formed on one of the first and second mold blocks, thereby defining a depth into which the actuator extends into the first cavity.

In some embodiments, the housing and the plunger may partially define a shape of a portion of a molded component formed within the first cavity.

In some embodiments, the molded component may include a feature formed in the second cavity between the housing and the plunger.

In some embodiments, the feature may include an aperture defined by a portion of the slide member.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

BRIEF DESCRIPTION OF THE DRAWINGS

FIG. 1 is a perspective view of a lifter for an injection mold in a first position according to the principles of the present disclosure;

FIG. 2 is a perspective view of the lifter of FIG. 1 in a second position;

FIG. 3 is an exploded perspective view of the lifter;

FIG. 6 is a cross-sectional view of a mold tool and the lifter in the first position taken along line 6-6 of FIG. 4; and FIG. 7 is a cross-sectional view of the mold tool and the lifter in the second position taken along line 7-7 of FIG. 5.

DETAILED DESCRIPTION

Figure 4:
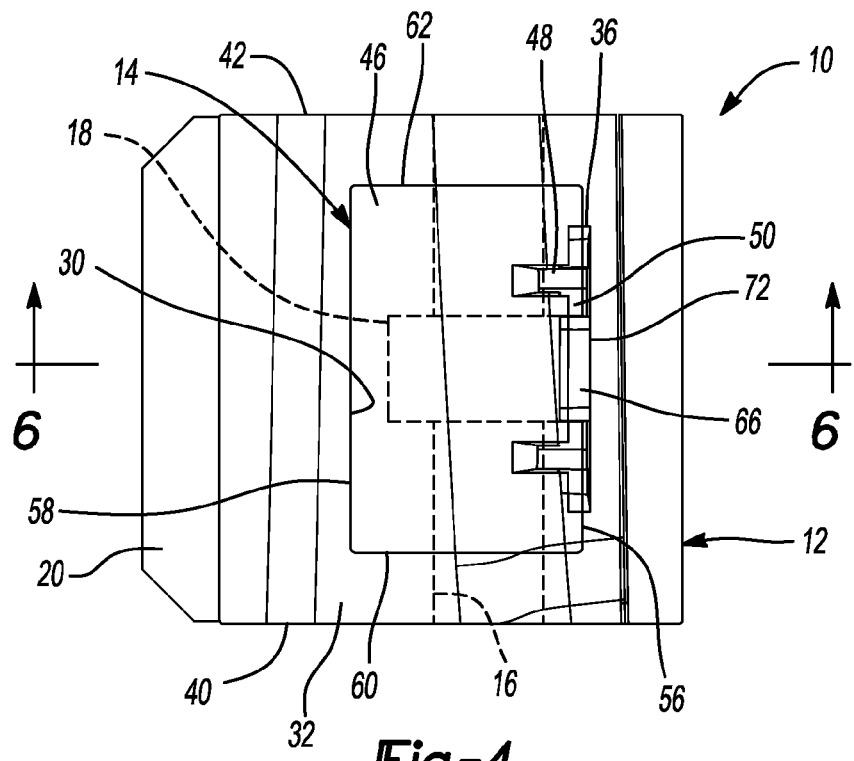
FIG. 4 is a top view of the lifter in the first position.
Figure 5:
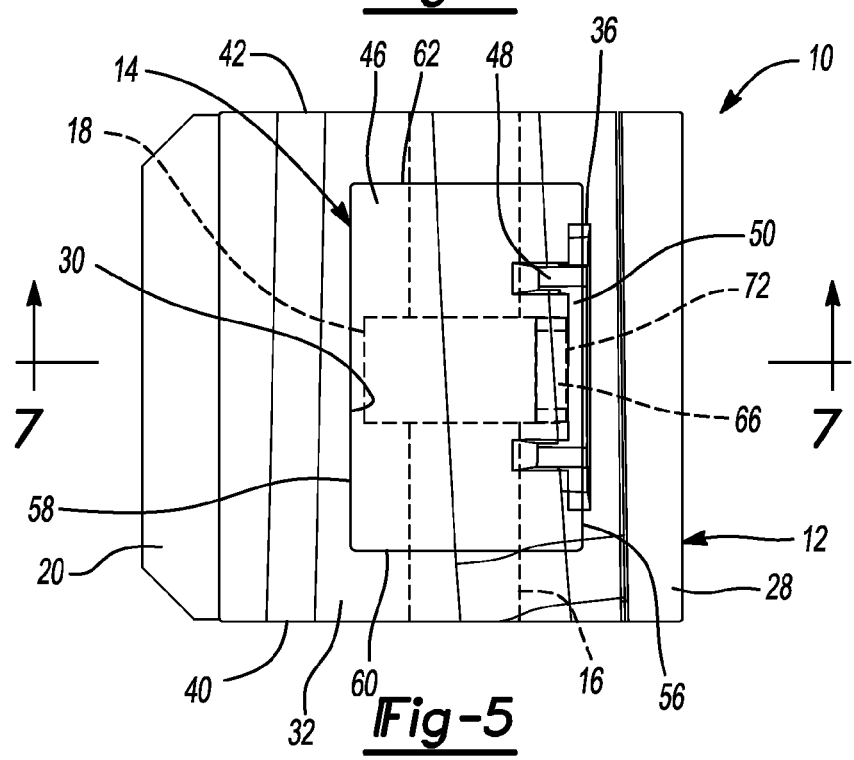
FIG. 5 is a top view of the lifter in the second position.

In an exemplary embodiment and with reference to FIGS. 1-7, an actuator or lifter 10 is provided that includes a housing 12, a plunger (or ejector) 14, a guide 16, a plug or inner slide member 18 and a stop member 20. The lifter 10 may be incorporated into an injection mold assembly 22 (shown schematically in FIGS. 6 and 7) to form a molded component 24 (shown schematically in FIGS. 6 and 7) having an aperture 26, recess, groove and/or any other type of depression or opening therein. The molded component 24 could be an automotive interior trim component, for example, or any other injection molded component.

The housing 12 includes a body 28 having an aperture 30 extending through first and second opposite ends 32, 34 of the body 28. The aperture 30 may include a recess 36 extending downward from the first end 32. A slot 38 extends through first and second opposite sides 40, 42 of the body 28 and may be in communication with the aperture 30. The slot 38 may be angled relative to the aperture 30 so that the slot 38 extends laterally away from the recess 36 as the slot 38 extends from the second end 34 to the first end 32. The guide 16 slidably engages the slot 38 for movement therein between a first position (FIG. 1) and a second position (FIG. 2). The stop member 20 may be partially received in a notch 44 in the body 28 and may extend outwardly therefrom.

The plunger 14 may be an elongated member that is slidably received in the aperture 30 of the housing 12 for movement relative to the housing between a first position (FIG. 1) and a second position (FIG. 2). A first end portion 46 of the plunger 14 may include a recess 48 that faces the recess 36 in the housing 12 such that the recesses 36, 48 cooperate to form a cavity 50 therebetween when the plunger 14 is in the first position. The cavity 50 may be a negative of a shape of a feature 52 (FIGS. 6 and 7) of the molded component 24.

The plunger 14 also includes an aperture 54 extending through first and second sides 56, 58 of the plunger 14. A portion of the aperture 54 may extend through a portion of the recess 48 in the plunger 14. The slide member 18 may be slidably received in the aperture 54 for movement between a first position (FIG. 6) and a second position (FIG. 7).

The plunger 14 also includes a slot 60 extending through third and fourth sides 62, 64 of the plunger 14 in a direction substantially perpendicular to the aperture 54. The slot 60 receives the guide 16 and is oriented at substantially the same angle as the slot 38 of the housing 12. The slot 60 is sized to allow movement of the guide 16 therein toward and away from the first side 56 of the plunger 14 between a first position (FIG. 4) and a second position (FIG. 5), respectively.

The slide member 18 may include a boss 66, a recess 68 and a slot 70 (as shown in FIG. 3). The boss 66 defines a first side 72 of the slide member 18. The recess 68 may be formed in the first side 72 adjacent the boss 66. The slot 70 extends through second and third opposite sides 74, 76 of the slide member 18 and is oriented at substantially the same angle as the slots 38, 60. The slot 70 receives the guide 16 therethrough. As described above, the slide member 18 is slidably received in the aperture 54 in the plunger 14 between the first position (FIGS. 4 and 6) in which the boss 66 is disposed in the cavity 50 between the housing 12 and the plunger 14 and the second position (FIGS. 5 and 7) in which the boss 66 is retracted out of the cavity 50.

As shown in FIGS. 6 and 7, the injection mold assembly 22 may include a first mold portion 80 and a second mold portion 82. The first and second mold portions 80, 82 may cooperate to form a cavity 84 therebetween when the first and second mold portions 80, 82 are in contact with each other (as shown in FIG. 6). The cavity 84 provides a shape of the molded component 24 such that the molded component 24 may be formed within the cavity 84 when liquid plastic (molten resin) is injected into the cavity 84 and is allowed to solidify therein.

As shown in FIG. 6, the housing 12 may be received in an aperture 86 in the second mold portion 82 so that the first end 32 of the housing 12 and the first end portion 46 of the plunger 14 are disposed within the cavity 84. Interference between the stop member 20 and the second mold portion 82 may position the lifter 10 relative to the cavity 84. With the first end 32 of the housing 12 disposed within the cavity 84, the cavity 50 of the lifter 10 is in communication with the cavity 84 so that liquid plastic injected into the cavity 84 can flow into the cavity 50 to form the feature 52 of the molded component 24. As described above, when the plunger 14 is in the first position (FIGS. 4 and 6), the boss 66 of the slide member 18 is disposed within the cavity 50. Therefore, when liquid plastic is injected into the cavities 84, 50 with the slide member 18 in the first position, the boss 66 creates the aperture 26 in the feature 52 of the molded component 24 by preventing the flow of molten resin into a space in which the aperture 26 is to be formed.

An actuator (e.g., a hydraulic, electro-mechanical or pneumatic actuator; not shown) may move the plunger 14 relative to the housing 12 between the first and second positions. Because the guide 16 is received in the slot 60 in the plunger 14, relative movement between the plunger 14 and the housing 12 causes corresponding movement of the guide 16 within the slot 38. Due to the angled orientation of the slot 38, the guide 16 moves away from the cavity 50 (i.e., from right to left from the position shown in FIGS. 4 and 6 to the position shown in FIGS. 5 and 7) as the guide 16 moves upward within the slot 38 toward the first end 32 of the housing 12. The guide 16 is engaged with the slide member 18, and therefore, movement of the guide 16 toward and away from the cavity 50 causes corresponding movement of the slide member 18 toward and away from the cavity 50 in a direction perpendicular to the direction of movement of the plunger 14. Therefore, when the plunger 14 is moved upward (relative to the frame of reference depicted in FIGS. 6 and 7) into the second position (FIGS. 5 and 7), the plunger 14 moves the molded component 24 away from the second mold portion 82 while the boss 66 of the slide member 18 is retracted laterally out of the cavity 50 to allow the molded component 24 to disengage the lifter 10 and the mold assembly 22.

The shapes of the cavities 50, 84, the first and second mold portions 80, 82 and the ends of the housing 12 and plunger 14 that are received in the cavity 84 can be varied from the shapes shown in the figures to form a molded component having a desired shape. Therefore, it will be appreciated that the shapes of the cavities 50, 84, the first and second mold portions 80, 82 and the ends of the housing 12 and plunger 14 shown in the figures are for illustration purposes only, and the principles of the present disclosure are not limited to those shapes. Furthermore, while the mold assembly 22 and the lifter 10 are described above as being used in a plastic-injection molding process, it will be appreciated that the lifter 10 could be used to mold components of any other material.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An actuator for an injection molding tool, the actuator comprising:
   a housing including an aperture extending therethrough, the aperture including a first recess extending through an open end of the aperture;
   a plunger slidably received in the aperture and movable therein relative to the housing between first and second positions, the plunger including a second recess formed therein that cooperates with the first recess to define a cavity when the plunger is in the first position; and
   a slide member slidably engaging the plunger for movement with the plunger between an extended position in which the slide member extends into the cavity and a retracted position in which the slide member is retracted out of the cavity.

2. The actuator of claim 1, wherein movement of the plunger relative to housing from the first position to the second position causes corresponding movement of the slide member from the extended position to the retracted position.

3. The actuator of claim 2, wherein the plunger moves relative to the housing between the first and second positions in a first direction and the slide member moves relative to the plunger between the extended and retracted positions in a second direction that is perpendicular to the first direction.

4. The actuator of claim 1, further comprising a guide slidably engaging the housing and attached to the slide member for movement with the slide member between the extended and retracted positions.

5. The actuator of claim 4, wherein the housing includes a slot that is angled relative to a direction in which the plunger moves relative to the housing between the first and second positions, and wherein the guide slidably engages the slot.

6. The actuator of claim 1, further comprising a stop member extending outward from an exterior surface of the housing.

7. The actuator of claim 1, wherein the plunger moves in a linear path relative to the housing between the first and second positions.

8. The actuator of claim 7, wherein the slide member moves in a linear path relative to the plunger between the extended and retracted positions.

9. An injection molding tool including the actuator of claim 1 and further comprising first and second mold blocks defining another cavity therebetween that is in communication with the cavity defined by the first recess in the housing and the second recess in the plunger.

10. The injection molding tool of claim 9, wherein the housing and the plunger extend into the cavity defined by the first and second mold blocks.

11. The injection molding tool of claim 10, wherein a stop member extends outward from an exterior surface of the housing and engages the first mold block to position the actuator relative to the first mold block.

12. An injection molding tool comprising:
    a first mold block;
    a second mold block cooperating with the first mold block to define a first cavity therebetween; and
    an actuator supported by one of the first and second mold blocks, the actuator including a housing, a plunger and a slide member, the plunger being movable within the housing and cooperating with the housing to define a second cavity therebetween that is in communication with the first cavity, the slide member movable with to the plunger between an extended position in which a portion of the slide member is received in the second cavity and a retracted position in which the portion of the slide member is retracted from the second cavity.

13. The injection molding tool of claim 12, wherein the slide member moves between the extended and retracted positions in response to movement of the plunger relative to the housing.

14. The injection molding tool of claim 13, wherein the housing includes an aperture extending therethrough and a first recess extending through an open end of the aperture, and wherein the plunger is slidably received in the aperture and includes a second recess that cooperates with the first recess to define the second cavity.

15. The injection molding tool of claim 14, wherein the plunger moves within the aperture in the housing in a first direction and the slide member moves relative to the plunger between the extended and retracted positions in a second direction that is perpendicular to the first direction.

16. The injection molding tool of claim 12, wherein the actuator includes a guide slidably engaging the housing and attached to the slide member for movement with the slide member between the extended and retracted positions.

17. The injection molding tool of claim 16, wherein the housing includes a slot that is angled relative to a direction in which the plunger moves relative to the housing, and wherein the guide slidably engages the slot.

18. The injection molding tool of claim 12, wherein the plunger moves in a first linear path relative to the housing between first and second positions, and the slide member moves in a second linear path relative to the plunger between the extended and retracted positions, and wherein the first and second linear paths are perpendicular to each other.

19. The injection molding tool of claim 12, wherein the housing and the plunger extend into the first cavity.

20. The injection molding tool of claim 19, wherein the actuator includes a stop member that extends outward from an exterior surface of the housing and engages one of the first and second mold blocks to position the actuator relative thereto.

* * * * *